United States Patent
Xu et al.

(10) Patent No.: US 10,938,967 B2
(45) Date of Patent: *Mar. 2, 2021

(54) METHOD AND APPARATUS FOR COMMUNICATION IN A MOTOR DRIVE APPLICATION

(71) Applicant: Rockwell Automation Technologies, Inc., Mayfield Heights, OH (US)

(72) Inventors: Dayin Xu, Shanghai (CN); Zhenhuan Yuan, Shanghai (CN); Robert H. Schmidt, Germantown, WI (US); Guolin Zhang, Shanghai (CN); Scott D. Braun, Menomonee Falls, WI (US); Fuhua Ding, Plymouth, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/522,875

(22) Filed: Jul. 26, 2019

(65) Prior Publication Data
US 2019/0349456 A1 Nov. 14, 2019

Related U.S. Application Data

(63) Continuation of application No. 15/719,925, filed on Sep. 29, 2017, now Pat. No. 10,375,216.

(51) Int. Cl.
*H04L 29/06* (2006.01)
*H04L 29/08* (2006.01)
(Continued)

(52) U.S. Cl.
CPC .......... *H04L 69/26* (2013.01); *G05B 19/4185* (2013.01); *H04L 12/4625* (2013.01);
(Continued)

(58) Field of Classification Search
CPC ..... H04L 69/26; H04L 69/18; H04L 12/4625; H04L 49/35; H04L 67/12; H04L 45/302; G05B 19/4185
See application file for complete search history.

(56) References Cited

U.S. PATENT DOCUMENTS

| 2006/0245454 A1 | 11/2006 | Balasubramanian et al. |
| 2007/0058929 A1 | 3/2007 | Chaffee |

(Continued)

OTHER PUBLICATIONS

Santos R. et al.; "Designing a customized Ethernet switch for safe hard real-time communication"; Factory Communication Systems, 2008. WFCS 2008. IEEE International Workshop on, IEEE, Piscataway, NJ, USA; dated May 21, 2008, pp. 169-177—(10 pages).

(Continued)

*Primary Examiner* — Candal Elpenord
(74) *Attorney, Agent, or Firm* — Boyle Fredrickson, SC

(57) ABSTRACT

The subject matter disclosed herein describes a switch embedded in a motor controller and a network protocol executing on the switch to provide communication between devices connected to the motor controller in a motor drive application. The embedded switch is configured to communicate via separate ports with an external controller, a network interface for the motor controller, additional motor controllers, and with the motor or other devices mounted on the motor. The network protocol includes a first tier for data that requires deterministic delivery at a high data rate, a second tier for data that requires a high delivery rate but is also tolerant of some variation in delivery time, and a third tier for data that may be delivered at a slower data rate. The embedded switch receives data at any port, identifies the communication tier to which the data belongs, and delivers it to another port accordingly.

20 Claims, 5 Drawing Sheets

(51) Int. Cl.
    *H04L 12/46* (2006.01)
    *H04L 12/725* (2013.01)
    *H04L 12/931* (2013.01)
    *G05B 19/418* (2006.01)

(52) U.S. Cl.
    CPC ............ *H04L 45/302* (2013.01); *H04L 49/35* (2013.01); *H04L 67/12* (2013.01); *H04L 69/18* (2013.01)

(56) References Cited

U.S. PATENT DOCUMENTS

| | | |
|---|---|---|
| 2007/0186011 A1 | 8/2007 | Batke et al. |
| 2011/0060427 A1 | 3/2011 | Batke et al. |
| 2014/0086242 A1 | 3/2014 | Drew et al. |
| 2014/0105004 A1 | 4/2014 | Batke et al. |
| 2014/0269306 A1 | 9/2014 | Alsup et al. |
| 2014/0285120 A1 | 9/2014 | Gries et al. |
| 2015/0077024 A1 | 3/2015 | Kuhn |
| 2015/0078200 A1 | 3/2015 | Kalkunte et al. |
| 2019/0171187 A1* | 6/2019 | Cella ............... G06N 20/00 |

OTHER PUBLICATIONS

Embedded—PC CX2000: PC-based Control als Basistechnologie fur Industrie 4.0; PC Control Magazin; dated Jun. 1, 2014: https://www.pc-control.net/pdf/022014/pcc_0214_d.pdf—(60 pages).

\* cited by examiner

METHOD AND APPARATUS FOR COMMUNICATION IN A MOTOR DRIVE APPLICATION

CROSS-REFERENCE TO RELATED APPLICATIONS

This application is a continuation of and claims priority to U.S. application Ser. No. 15/719,925, filed Sep. 29, 2017, the entire contents of which is incorporated herein by reference.

BACKGROUND INFORMATION

The subject matter disclosed herein relates generally to a method and system for communication in a motor drive application and, more specifically, to a method and system for providing network communications between a motor drive, a motor, and other end points connected to the motor drive.

Servo motors are one type of motor which are typically employed in applications that require precise positioning. Exemplary applications for servo motors include robotics, automated manufacturing, conveyor systems, pick and place machinery, computer numerical control (CNC) for precise machining, printing applications, and the like. Servo motors are commonly paired with a motor controller and a position feedback device where the servo motor controller may include algorithms paired with the motor and the position feedback device has high resolution to facilitate precise positioning.

Commonly, servo motors and motor controllers are incorporated into a larger controlled machine, system, or process. The controlled machine, system, or process may include a central controller, one or more distributed industrial controllers, and often multiple servo motors and motor controllers. The central controller may be a desktop computer located in a control room or in a remote facility. Optionally, the central controller may be an industrial computer, configured to operate in a harsh environment and located at the controlled machine, system, or process. The industrial controllers include processors and operating systems optimized for real-time control and are programmed with languages designed to permit rapid development of control programs tailored to a constantly varying set of machine control or process control applications.

An industrial control network is typically employed to facilitate communications between devices in the controlled machine, system, or process. The industrial networks are typically selected to exhibit highly reliability and real-time communication. The industrial network may utilize protocols such as EtherCAT®, Ethernet/IP®, or Profinet® which have been developed for automation applications and include features such as a guaranteed maximum communication delay, low communication jitter, pre-scheduling of the communication capacity of the network, and/or providing seamless redundant communication capabilities for high-availability.

Historically, it has been known to install the network between controllers, such as the central controller and the industrial controller. Further, certain devices such as motor drives may be configurable, include a large parameter set, have sufficient processing capabilities, or the like such that they may include a network interface and are also connected to the industrial network. Other devices, however, such as motors, sensors, relays, and other actuators, provide input signals to or receive output signals from one of the controllers and perform fixed tasks in the controlled machine, system, or process. These devices are typically located remotely, and often at long runs, from the control cabinets in which the controllers are located. Wiring must be run between the control cabinets and each of the device. Because of the expense of running network cabling to and providing network interfaces on every device, many of these devices are not connected directly to the network. The input and/or output signals are transmitted directly between one of the controllers and the device. Optionally groups of signals may be routed to an intermediate location and pass through a gateway which is connected to the industrial network and which can convert the input and output signals from separate signals to data in a message packet to be transmitted via the desired industrial protocol for at least a portion of the distance between the controllers and the devices.

Traditionally, a motor controller has served as a gateway in the industrial network. The motor controller includes a network interface and is configured to communicate via the industrial network. The motor controller also communicates on a point-to-point basis to transmit and receive output and input signals with devices connected to the motor controller. The devices include, for example, a brake on the motor, or a temperature sensor, or a position encoder mounted on the motor.

However, recent trends have been to include additional sensors on the motor to monitor operating conditions in the motor. The additional sensors may include, for example, vibration sensors mounted to the motor as disclosed in U.S. Pat. No. 9,673,685 to measure the vibration present on the motor. Temperature sensors may be mounted at different locations on the motor and/or encoder to provide information on ambient conditions or to provide early detection of an impending failure in the motor.

The addition of additional devices communicating with the motor controller introduces an additional burden on the resources of the motor controller. The communications interfaces must process additional signals. Further, different communications protocols may be utilized by different devices, requiring the motor controller to be able to accept each of the communication protocols. Certain communications are unidirectional, providing, for example, data from a sensor to the motor controller, but preventing, for example, configuration of the sensor by the motor controller. For devices that allow bidirectional communication with the motor controller, the communication is restricted to configuration data and does not provide for control of the device over the network. Further, increasing complexity and more demanding performance requirements for control routines to control operation of the motor place competing demands on the resources of the motor controller.

Thus, it would be desirable to provide an improved method and system for communication among devices connected to a motor controller in a motor drive application.

BRIEF DESCRIPTION

The subject matter disclosed herein describes an improved method and system for communication between devices connected to a motor controller in a motor drive application. The improved method and system includes a switch embedded in the motor controller and a network protocol executing on the switch. The embedded switch is configured to communicate via a first port with an external controller, via a second port with the motor or other devices mounted on the motor, via a third port with additional motor controllers, and via a fourth port with a network interface for the motor controller. The network protocol is a three-tier communication protocol implemented in the motor controller.

A first tier for the network protocol includes data that requires deterministic delivery at a high data rate. The amount of data included in the first tier is limited to prevent overloading the communication bandwidth. The data in the first tier includes data required for motor control, such as position feedback data between the encoder and the motor controller.

A second tier for the network protocol includes data that requires a high delivery rate but is also tolerant of some variation in delivery time. The amount of data included in the second tier is again limited to prevent overloading the communication bandwidth. This data is tolerant of a best effort level of service rather than requiring deterministic data delivery and includes, for example, command data from an external controller intended for the motor controller or for other devices on the network downstream from the motor controller.

A third tier for the network protocol includes data that may be delivered at a slower data rate. The amount of data in the third tier is not limited and may, for example, be apportioned into data segments and delivered during periods of spare communication bandwidth. The data in the third tier includes slow changing data or data that is not critical for control of the motor. The data may include, for example, health and analytical data monitoring operation of the motor. The data may further include a time stamp for subsequent analysis as the transmission may be in bulk at a later time than the recordation of the data.

The embedded switch receives data at any of the four ports and identifies at which of the three tiers the data belongs. The embedded switch prioritizes delivery of data according to the three tiers defined above and transmits data between ports according to which of the three tiers the data belongs. The embedded switch allows network topologies, such as daisy chaining devices with the motor controller and further allows bidirectional real-time communications between the motor controller and external devices.

According to one embodiment of the invention, an embedded network switching device for managing communication of real-time control data in a motor drive application is disclosed. The embedded network switching device includes a controller and four ports. The first port is in communication with the controller and is configured to be connected to an industrial network. The second port is in communication with the controller and is configured to be connected to at least one control device for real-time communication of control data. The third port is in communication with the controller and is configured to be connected to the industrial network, and the fourth port is in communication with the controller and is configured to be connected to a network interface of a device within which the network switching device is embedded. The controller is operative to receive data formatted in one of a plurality of data protocols at any one of the first, second, third, and fourth ports and to transfer the data to another of the first, second, third, and fourth ports as a function of the data protocol in which the data was received.

According to another embodiment of the invention, a method for managing communication of real-time control data in a motor drive application is disclosed. Data formatted in a first data protocol, a second data protocol, or a third data protocol is received at a first port, a second port, a third port, or a fourth port of a network switching device embedded in a motor drive. The data received is identified as belonging to a first data type, a second data type, or a third data type with a controller in the embedded network switching device. The first data type corresponds to data formatted in the first data protocol, the second data type corresponds to data formatted in the second data protocol, and the third data type corresponds to data formatted in the third data protocol. The received data is transmitted to another of the first port, second port, third port, and fourth port as a function of the data type. The first data type is real-time control data requiring deterministic communications, and the first data type is transmitted between at least one control device external to the motor drive and a network interface of the motor drive.

According to yet another embodiment of the invention, a system for managing communication of real-time control data in a motor drive application is disclosed. The system includes a motor drive and a motor. The motor drive includes a first embedded network switching device, and the motor includes a second embedded network switching device. The first embedded network switching device includes a first controller and four ports. The first port is in communication with the first controller and is configured to be connected to an industrial network. The second port is in communication with the first controller and is configured to be connected to at least one control device for real-time communication of control data. The third port is in communication with the first controller and is configured to be connected to the industrial network. The fourth port is in communication with the first controller and is configured to be connected to a network interface of the motor drive. The first controller is operative to receive data formatted in one of a plurality of data protocols at any one of the first, second, third, and fourth ports and to transfer the data to another of the first, second, third, and fourth ports as a function of the data protocol in which the data was received. The motor is the at least one control device to which the second port of the first embedded network switching device is connected, and the second embedded network switching device includes a second controller and a fifth port in communication between the second controller and the second port. A sixth port is in communication with the second controller and is configured to be connected to a sensing module. The second controller receives real time control data from the fifth port and sensing data from the sixth port.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
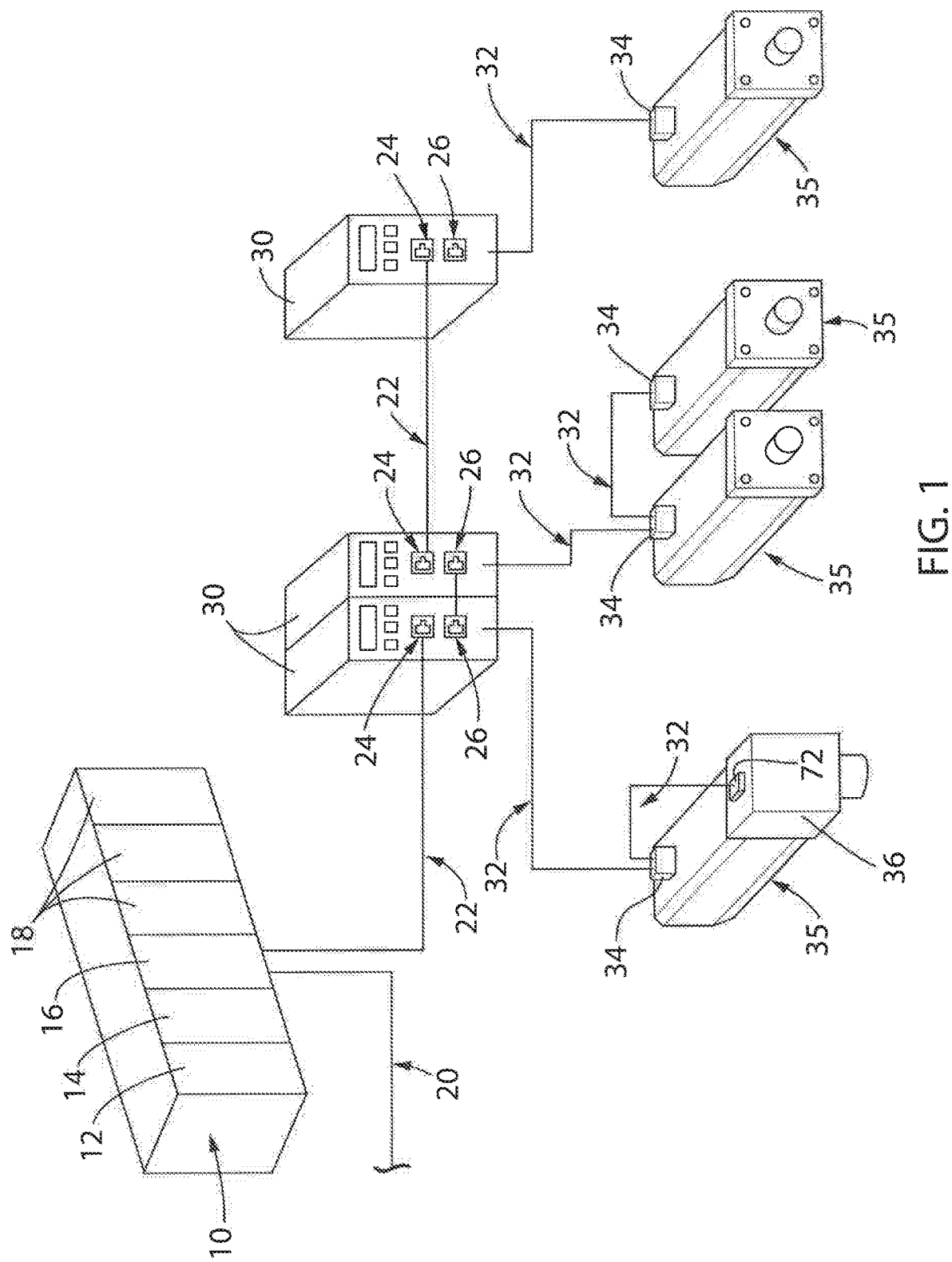
FIG. 1 is a perspective view of an exemplary motor drive application incorporating the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary motor drive application is illustrated. The exemplary motor drive application includes an industrial controller 10, also referred to herein as a programmable automation controller (PAC). The industrial controller 10 is modular and may be made up of numerous different modules connected together in a rack or mounted to a rail. Additional modules may be added or existing modules removed and the industrial controller 10 reconfigured to accommodate the new configuration. Optionally, the industrial controller 10 may have a predetermined and fixed configuration. The illustrated industrial controller 10 includes a power supply module 12, a processor module 14, a network module 16, and three additional modules 18 that may be selected according to the application requirements and may be, for example, analog or digital input or output modules, which will be referred to herein generally as an I/O module 18.

The industrial controllers 10 are connected to other devices by one or more networks according to the application requirements. As illustrated, a first network cable 20 connects the network module 16 of the industrial controller 10 to an external network, which may be the Internet or an intranet. It is contemplated that the first network cable 20 may be a standard Ethernet cable including, for example, twisted pair, fiber optic, or coaxial conductors to transmit data according to any standard Ethernet protocol. Optionally, a gateway may be provided between the industrial controller 10 and the external network and the first network cable 20 may be of any suitable construction and configured to communicate via a proprietary protocol or by any standard industrial protocol, including, but not limited to, Ethernet/IP®, DeviceNet®, ControlNet®, EtherCAT®, or Profinet®. A second network cable 22 is connected between the network module 16 of the industrial controller 10 and a motor drive 30. The second network cable 22 may be of any suitable construction and configured to communicate via a proprietary protocol or by any standard industrial protocol, including, but not limited to, Ethernet/IP®, DeviceNet®, ControlNet®, EtherCAT®, or Profinet®. Each network module 16 is configured to communicate according to the protocol of the network to which it is connected and may be further configured to translate messages between two different network protocols. As further illustrated in FIG. 2 and as will be discussed in more detail below, an embedded switch 100 may be included in the network module 16 to facilitate communications between devices in the motor drive application.

The illustrated motor drive application includes four motors 35 and three motor drives 30. According to the illustrated application, the first motor drive 30 is connected to the network module 16 via a first network port 24 located on the motor drive 30. A second motor drive 30 is then connected in a daisy chain connection between a second network port 26 on both the first and second motor drives 30. A third motor drive 30 is also connected in a daisy chain connection between the first network ports 24 on the second and third motor drives 30. It is understood that the number and configuration of motors 35 and motor drives 30 may vary according to the application requirements without deviating from the scope of the invention. Each motor drive 30 includes at least one motor 35 connected to the motor drive 30 via a combined power and communication cable 32. The combined power and communication cable 32 is connected between terminals on the motor drive 30 and terminals in a connection box 34 located on each motor 35. Optionally, separate cables and/or individual conductors may be connected between the motor drive 30 and each motor 35 to conduct the power and control and/or communication signals transmitted between the motor drive 30 and each motor 35.

The first motor drive 30 is connected to a motor 35 which is, in turn, shown with a gearbox 36 connected to the drive shaft of the motor 35. A sensing module 72 is mounted to the gearbox and may include a temperature sensor, a vibration sensor, or any other sensor monitoring the health and/or operation of the gearbox 36. The sensing module 72 is connected via a power and communication cable 32 in a daisy chain connection from the first motor 35.

Figure 2:
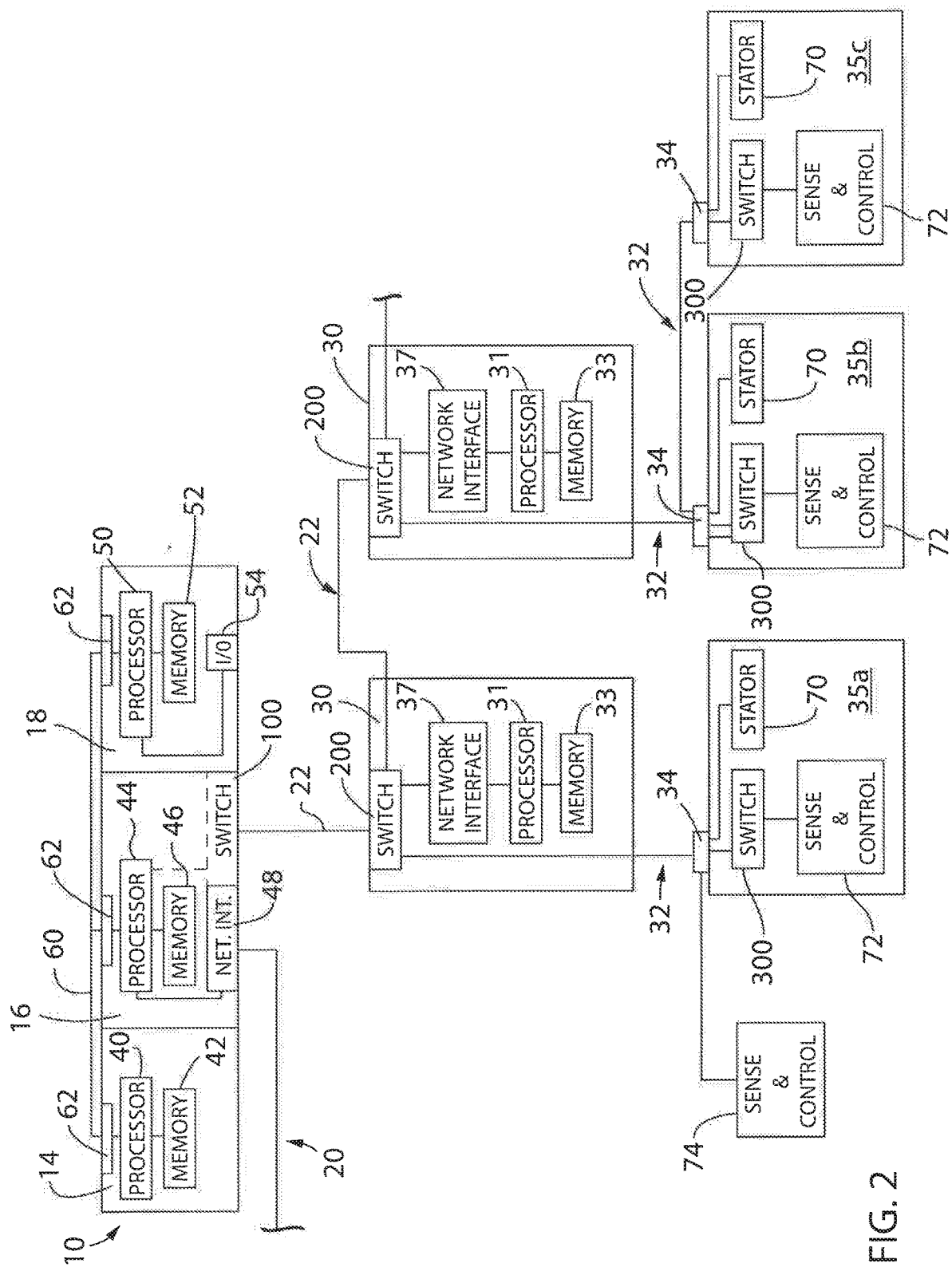
FIG. 2 is a partial block diagram representation of the exemplary motor drive application of FIG. 1.

The second motor drive 30 is illustrated as being connected to two motors 35. The second motor is connected to the first motor via a power and communication cable 32 in a daisy chain connection from the first motor 35. As will be discussed in more detail below, each motor 35 may include an embedded switch 300, as shown in FIG. 2, allowing network connections to be made in a daisy chain connection. As a result, a single network connection (e.g., the power and communication cable 32) may be run from the motor drive to the motor, or motors, and any additional sensing and/or control devices located proximate the motor. Each additional device may be connected via a short cable, reducing the cost of connecting multiple devices via a network connection to a control cabinet located remotely from the controlled devices.

Referring next to FIG. 2, a portion of the exemplary motor drive application shown in FIG. 1 is illustrated in block diagram form. Each of the modules 14, 16, 18 in the industrial controller 10 may include a processing device and memory. The functionality and size of the processing device and memory may vary according to the requirements of each module. However, each processing device may include a processor 40, 44, 50 configured to execute instructions and to access or store operating data and/or configuration parameters stored in the corresponding memory device 42, 46, 52. The processors 40, 44, 50 may be any suitable processor according to the module requirements. It is contemplated that processors 40, 44, 50 may include a single processing device or multiple processing devices executing in parallel and may be implemented in separate electronic devices or incorporated on a single electronic device, such as a microprocessor, a field programmable gate array (FPGA) or application specific integrated circuit (ASIC). Similarly, the memory devices 42, 46, 52 may be a single device, multiple devices or may be incorporated in part or in whole within the FPGA or ASIC.

The modules may further include additional logic and/or control circuits according to the module requirements. Each I/O module 18, for example, includes input and/or output terminals and the associated circuitry 54 to connect the I/O module to an external device. The network module 16 includes a network interface 48 configured to receive data packets from the external network. According to one embodiment, the network interface 48 is connected directly to the external network. The network interface may further be configured to be connected directly to the industrial network for the motor drive application. The processor 44 of the network module 16 may be configured to convert data packets between protocols. Optionally, a gateway device may be provided external to the network module 16 to convert data packets between network protocols and the network interface 48 may send and receive message packets according to a single industrial protocol.

According to still another embodiment, the network interface 48 may include an embedded switch 100. The embedded switch 100 may be directly connected to both the external network via the first network cable 20 and to the industrial network via the second network cable 22. As will be discussed in more detail below, the embedded switch 100 may be configured to identify one of a number of different data protocols in which the data is sent and to both prioritize data transmission and determine a particular port to which the data message is to be transferred as a function of the format of the data protocol in which the data message is received. The embedded switch 100 may be connected to the network interface 48 of the network module 16 via one of the ports on the embedded switch 100 and to one or more of the motor drives 30 via another port on the embedded switch 100.

According to the illustrated embodiment, both the motor drive 30 and the motor 35 in the motor drive application also include an embedded switch 200 and 300, respectively. Each embedded switch 200, 300 may be configured to identify one of a number of different data protocols in which the data is sent and to both prioritize data transmission and determine a particular port to which the data message is to be transferred as a function of the format of the data protocol in which the data message is received. The embedded switch 200 in the motor drive 30 is connected both to the network module 16 and to the motor 35 via one of the ports on the embedded switch 200. An additional port on the embedded switch 200 in the motor drive 30 is also connected to another motor drive 30, allowing each multiple motor drives 30 to be connected in a daisy chain manner from the network module 16. The embedded switch 300 in the motor 35 is connected between the motor drive 30 and any sensing and/or control devices 72, 74 that may be present on or external to the motor 35, respectively. As further illustrated, one port of the embedded switch 300 in the motor 35 also allows a daisy chain connection with the motor 35 positioned between the motor drive 30 and another device on the network. The first motor 35a is illustrated with a daisy chain connection to external sensing and/or control devices 74, while the second motor 35b is illustrated with a daisy chain connection to a third motor 35c. If a combined power and communication cable 32 is provided from the motor drive 30 to the motor 35, it is contemplated that a second combined power and communication cable 32 may be provided between the first motor 35a and the sensing and/or control device 74 or between the second motor 35b and the third motor 35c if the rating for the motor drive 30 is sufficient to provide power to each device connected on the network in series from the motor drive 30. The daisy chain connection between motor drives 30 and/or motors 35 may significantly decrease wiring costs and complexity in the motor drive application.

Figure 3:
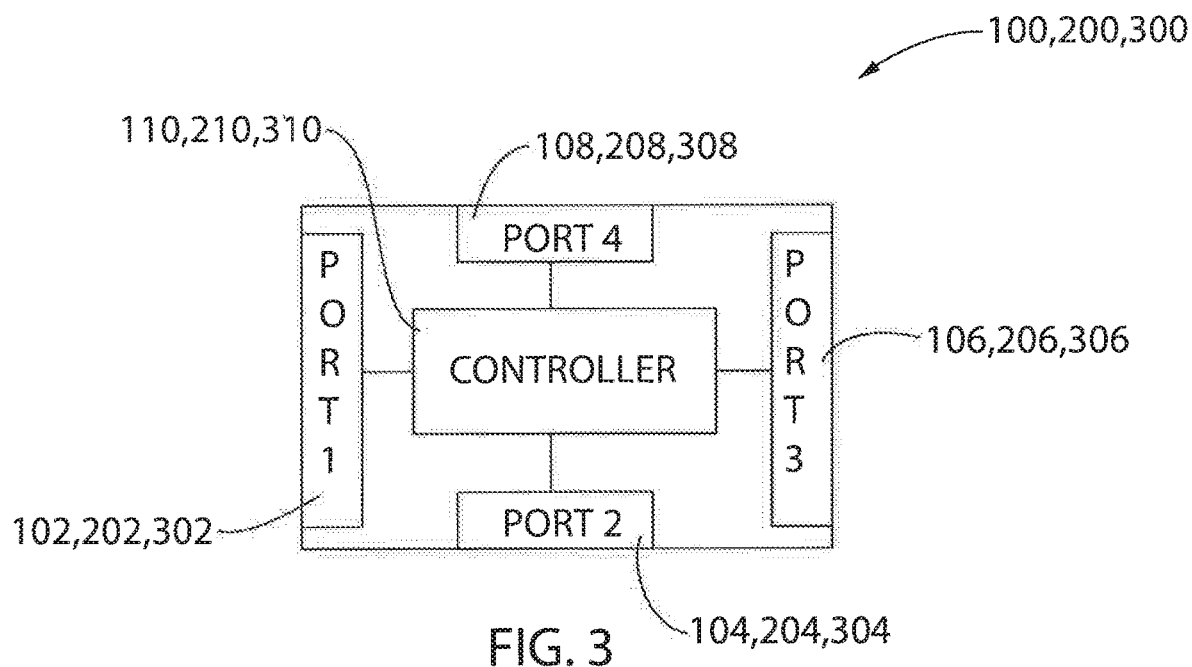
FIG. 3 is a block diagram representation of an embedded switch according to one embodiment of the invention.

Turning next to FIG. 3, an embedded switch according to one embodiment of the invention is illustrated. It is contemplated that the embedded switches 100, 200, 300 discussed above with respect to the network interface module 16, motor drive 30, and motor 35, respectively, may have similar or identical construction. For ease of discussion, a single embedded switch is illustrated and will be discussed with respect to each of the embedded switches 100, 200, 300. The embedded switch 100, 200, 300 includes multiple ports and a controller 110, 210, 310 in communication with each of the ports. According to the illustrated embodiment, each embedded switch 100, 200, 300 includes a first port 102, 202, 302; a second port 104, 204, 304; a third port 106, 206, 306; and a fourth port 108, 208, 308. Each port is connected to and is in communication with a controller 110, 210, 310.

Each controller 110, 210, 310 may include a processing device, memory, logic circuits, or a combination thereof to receive data packets from each of the ports and to perform some initial processing on each data packet to determine to which of the other ports the data packet is to be transferred. Each controller may include a processor configured to execute instructions and to access or store operating data and/or configuration parameters in a corresponding memory device. It is contemplated that the controllers 110, 210, 310 may include a single processing device or multiple processing devices executing in parallel and may be implemented in separate electronic devices or incorporated on a single electronic device, such as a microprocessor, a field programmable gate array (FPGA) or application specific integrated circuit (ASIC). Similarly, a corresponding memory device may be a single device, multiple devices or may be incorporated in part or in whole within the FPGA or ASIC.

In operation, the controller 110, 210, 310 on each embedded switch 100, 200, 300 detects and supports multiple communication protocols to improve communication in the motor drive application. The controller examines each data packet received at a port and determines whether the data packet belongs to one of three different protocols. The controller then transfers the data packet from the port at which it was received to another port on the embedded switch as a function of the data protocol. The controller executes a schedule to transmit each of the different data protocols through the embedded switch and allows for preemption of a transfer of a prior data message if a data message of a higher priority is received. The controller further filters data packets to prevent unnecessary traffic from being transmitted to certain devices within the motor drive application.

In a motor drive application, a first portion of the data transmitted, for example, between the motor 35 and the motor drive 30 is utilized by the motor control function. To achieve proper operation of the motor, the first portion of data must be transmitted in a deterministic manner. In other words, the data must be transmitted within a predefined time window at a predictable and repeatable time interval. The amount of data being utilized for the motor control function is limited to a small amount allowing for transmission at a high frequency. This data will be referred to herein as motor control function (MCF) data and constitutes a first type of data. The MCF data may include, but is not limited to, angular position feedback data for the motor, current feedback, vibration data, or other real-time data monitoring of operation of the motor which is, in turn, utilized to control operation of the motor. According to one embodiment of the invention, the MCF data must be updated within the motor drive 30 every one hundred microseconds. Preferably, the MCF data is updated within the motor drive 30 every fifty microseconds, and, more preferably, the MCF data is updated within the motor drive 30 every thirty-two microseconds.

A second portion of the data transmitted in the motor drive application may not require deterministic transmission but may still require a high transmission rate. In the second portion of data, it may be acceptable to have a data packet fail transmission as long as a retransmission is completed within the desired transmission window. The amount of data defined to be transmitted within the second portion of data is again limited to allow for the high transmission rate. According to one embodiment of the invention, the second portion of data must be updated within the motor drive 30 every ten milliseconds, and, preferably, the second portion of data is updated within the motor drive 30 every millisecond. The data transmitted in the second portion of data may be data utilized by the industrial controller 10, or the programmable automation controller (PAC). This data utilized by the PAC will be referred to herein as PAC data and constitutes a second type of data. The PAC data may include but is not limited to control signals from the PAC to energize a motor brake or feedback signals providing an indication of the motor brake being open or of an overspeed condition in the motor. The PAC data may include input signals for the PAC and utilized by the control program executing in the PAC to set output signals as a function of the input signals to control operation of the motor drive application.

A third portion of the data transmitted in the motor drive application may have either no or low transmission rate requirements. The third portion of data does not require deterministic transmission and may be transmitted at varying time intervals. The third portion of data includes all other data not included in the first and second portions. The third portion of data may be used, for example, to monitor motor health, such as operating temperature, vibration analysis not utilized for motor control, run time, loading conditions, and the like. The data transmitted in the third portion of data may be utilized by the PAC or transmitted to another processing and/or remote device for monitoring trends and long-term operating performance of the motor 35. This data will be referred to herein as analytics data and constitutes a third type of data. According to one embodiment of the invention, the third portion of data may be updated every two hundred fifty milliseconds and, more preferably, the third portion of data may be updated every one hundred milliseconds.

It is contemplated that the controller 110, 210, 310 for each embedded switch 100, 200, 300 may execute a transmission schedule stored in the controller to transmit data packets at the desired intervals. Any data packets received at the switch may temporarily be stored in a buffer. MFC data present in the buffer at any port may be transmitted to another port, according to the configuration of the switch, ever thirty-two microseconds. The amount of data included in the first portion of data is limited such that the full thirty-two microseconds is not required for transmission. The remaining portion of the time may be assigned to transmit either PAC data or analytics data. For example, the MFC data may require five microseconds to transmit and twenty-seven microseconds may remain. The schedule may further initiate the transfer of PAC data present in the buffer at any port every microsecond. The volume of PAC data is limited such that the full microsecond is not required for transmission. The schedule, however, must also ensure delivery of the deterministic MFC data. The schedule, therefore, may allocate, for example, ten microsecond blocks to execute during the dead-time of the MFC data, allowing both the MFC data and the PAC data to be transmitted at the desired intervals. Finally, the schedule may initiate transmission of analytics data during any time interval either not assigned for delivery of MK data or PAC data or during any time interval in which there is no MFC data or PAC data to be transmitted.

Figure 7:
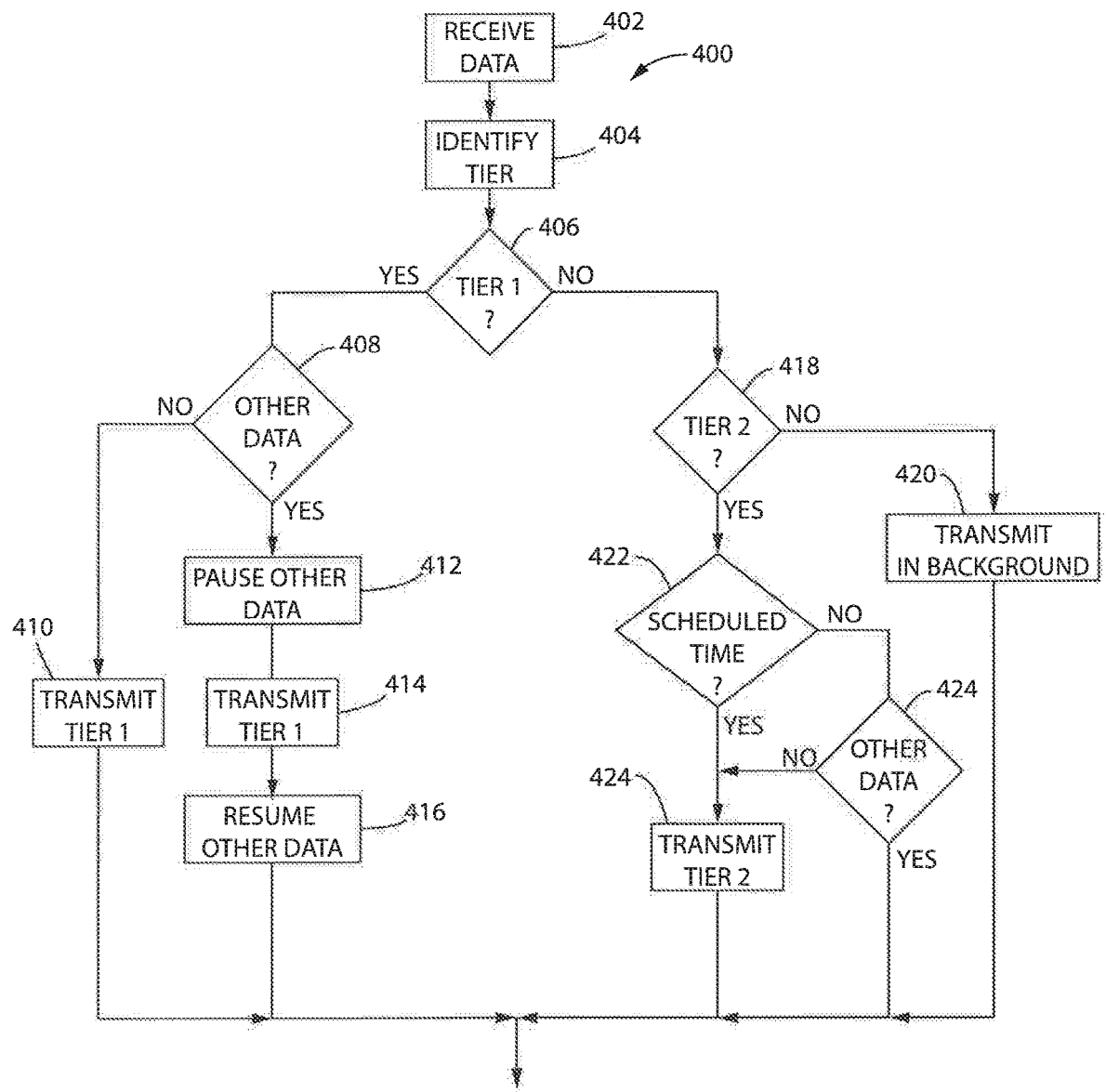
FIG. 7 is a flow chart illustrating a method of routing data packets within the embedded switch of FIG. 3.

Turning next, to FIG. 7, an exemplary flow chart 400 illustrating transmission of data packets through the embedded switch 100, 200, 300 is shown. At a first step 402, the embedded switch receives data at one of the ports. The controller 110, 210, 310 identifies to which tier of data each data packet belongs, as shown in step 404. Each tier corresponds to one portion of the data and the corresponding protocol by which the data is transmitted. For example, the first tier of data includes the first portion of data transmitted using the first protocol, the second tier of data includes the second portion of data transmitted using the second protocol, and the third tier of data includes the third portion of data transmitted using the third protocol.

At step 406, the controller 110, 210, 310 determines whether the data received at the switch belongs to the first tier of data. If the data received is first tier data, such as the MFC data, it requires deterministic transmission. At step 408, the controller checks whether other data is present and/or being transferred between ports on the embedded switch 100, 200, 300. The embedded switch may be configured to transfer data between ports on a priority basis, on a scheduled basis, or a combination thereof. If no other data is being transferred between ports on the embedded switch the controller transmits the tier 1 data to the appropriate port as shown in step 410. If there is other data being transferred, the controller may preempt transmission of lower tier data as shown in steps 412, 414, 416. The transfer of other data may be paused while the tier 1 data is transmitted, and then transfer of other data may be resumed once the tier 1 data has been transferred through the embedded switch.

If the data received is not first tier data, the data does not require deterministic transmission. There are, however, three tiers defined and the second and third tier have different transmission requirements. At step 418, the controller 110, 210, 310 determines whether the data received is second tier data. If not, then the data is third tier data and may be transmitted in the background, as shown in step 420, when no other data is being transmitted. Optionally, at least a portion of the third tier data may be scheduled for transmission, but first and/or second tier data may preempt the scheduled transmission. If, at step 418, the controller determines that the data received is tier 2 data, the controller determines whether it is the scheduled transmission time, as shown in step 422. If it is the scheduled time, the controller transmits the tier 2 data through the switch 100, 200, 300 as shown at step 424 with the potential for tier 1 data to preempt transmission.

If it is not a scheduled transmission time, the controller may still transmit data on a priority basis where tier 1 data is transmitted first, tier 2 data is transmitted second, and tier 3 data is transmitted third. During unscheduled transmission time, the tier 1 data may preempt other transmissions, but the tier 2 data may first determine whether other data is being transmitted, as shown in step 426. If other data is being transmitted and it is not a scheduled transmission period, the controller continues transmitting the other data. If no other data is being transmitted, the controller may transmit the tier 2 data.

Figure 4:
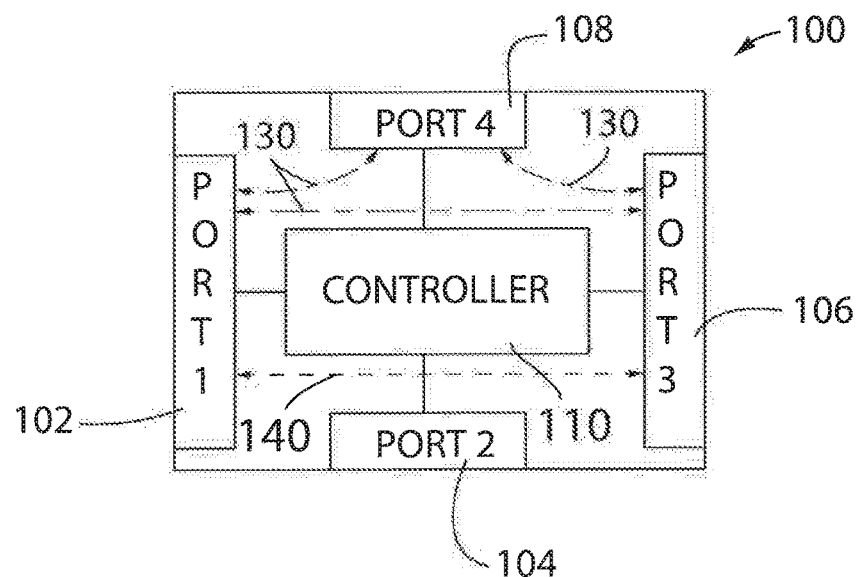
FIG. 4 is a block diagram representation of the embedded switch in FIG. 3 illustrating data flow paths in the network module of FIG. 2.

Transmission of data through the embedded switch 100, 200, 300 is dependent on the type of data received, as discussed above. The identification of ports which may receive and which transmit data of a particular type may be configured according to parameter settings stored in memory of the respective controller 110, 210, 310. With reference first, to FIG. 4, an embedded switch 100 is illustrated with an exemplary configuration for use in the network module 16 of the industrial controller 10. The network module 16 receives message packets on the first port 102 via the first network medium 20 and an external network. The message packets may include, for example, data, commands, or configuration information for the industrial controller 10, the motor drive 30, motor 35, or the like. As illustrated, the data is shown as second tier data with second tier data flow paths 130 identified. The controller 110 may be configured to examine each message packet and determine whether the message packet is intended for the industrial controller 10 or another device. If the message packet is intended for the industrial controller 10, the controller 110 transfers the message packet from the first port 102 to the fourth port 108, which is an internal port connected to the network interface 48 for the network module. If the message packet is intended for another device, the controller 110 transfers the message packet from the first port to the third port 106 for delivery via the industrial network 22. As also illustrated, third tier data may be passed from other devices connected on the industrial network to the third port 106. As illustrated, the embedded switch 100 is configured to transmit the third tier data along the third tier data flow path 140 to port 1 and to another processing device external to the industrial controller 10. The other processing device may store and process the third tier data, for example, to perform health and condition monitoring of the servo system. Optionally, the controller 110 may be configured to transfer the third tier data to the fourth port 108 and to the industrial controller 10 if the industrial controller 10 is configured to perform health and condition monitoring of the servo system.

Figure 5:
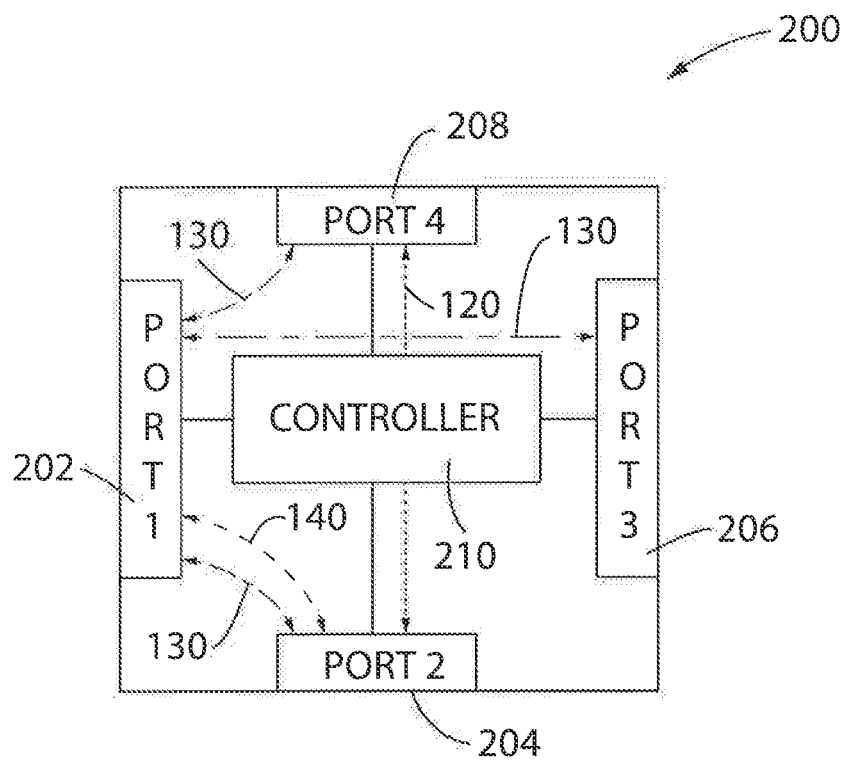
FIG. 5 is a block diagram representation of the embedded switch in FIG. 3 illustrating data flow paths in the motor drive of FIG. 2.

With reference next to FIG. 5, an embedded switch 200 is illustrated with an exemplary configuration for use in the motor drive 30 of the motor drive application. The motor drive 30 receives message packets from the industrial controller 10 on the first port 202 via the industrial network. The message packets may include, for example, data, commands, or configuration information for the motor drive 30, motor 35, sensing or control devices embedded in or external to the motor or the like and are typically second tier data as illustrated by the second tier data flow paths 130. The controller 210 identifies those packets intended for the motor drive 30 and delivers them to the fourth port 208. Packets intended for other devices may be transferred to the second port 204 or to the third port 206 for subsequent transmission along the industrial network 22. A portion of the second tier data may include PAC data from the industrial controller 10. The PAC data may be intended for the motor drive 30 or for control devices connected to the motor 35 or to the motor drive 30. It is contemplated that the PAC data may be configured to be delivered first to the motor drive 30 and subsequently transmitted as MFC data to the motor 35, as discussed below. Optionally, the PAC data may be configured to be delivered directly from the industrial controller 10 to the control device between the first port 202 and the second port 204 reducing the computational overhead on the controller in the motor drive 20.

The motor drive 30 is also configured to transmit MFC data between the motor drive 30 and the motor 35 as shown by the first tier data flow path 120. The MFC data may be transmitted between the fourth port 208, which is a port internal to, and which is connected to the network interface 37 of, the motor drive 30, and the second port 204, which is connected to the motor via a power and communication cable 32. The sense and control modules 72, 74 may also include a sensing device monitoring health and operation of the motor 35 and transmitting third tier data back to the motor drive 30. The third tier data may be received at the second port 204 and the controller 210 is configured to transfer the third tier data directly to the first port 202, as indicated by the third tier flow path 140, for subsequent delivery to the industrial controller 10 and/or a remote processing device.

Figure 6:
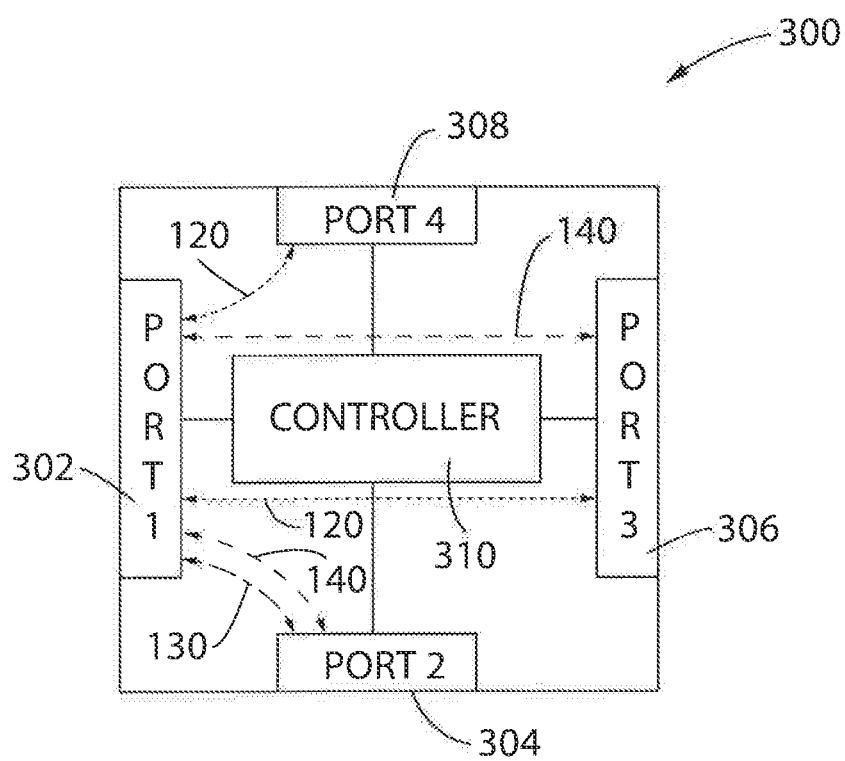
FIG. 6 is a block diagram representation of the embedded switch in FIG. 3 illustrating data flow paths in the motor of FIG. 2.

Turning then to FIG. 6, an embedded switch 300 is illustrated with an exemplary configuration for use in a motor 35 in the motor drive application. The motor 35 is connected to the motor drive 30 at the first port 302 and receives tier one data, such as the MFC data from the motor drive 30, and tier three data, such as configuration and/or data request messages for health and condition monitoring information from the sense and control module 72, 74. It is contemplated that the motor 35 may also include a distributed controller mounted to the motor which is, in turn, connected to the embedded switch 300 via the fourth port 308. In other embodiments, an intelligent sensor or actuator may be connected to the switch 300 via the industrial network and the third port 306. In still other embodiments and as illustrated in FIG. 2, a second motor may be connected in a daisy chain configuration to the third port 306 of the first motor. The controller 310 is configured to identify data packets intended for the corresponding motor 35 in which the switch 300 is embedded. The tier one data may be transmitted via the first tier data flow path 120 to the embedded controller within the motor, if present, via the fourth port 308 or to the intelligent sensor or actuator via the third port 306. Data packets intended for the second motor are passed through the first switch 300 to a second switch in the second motor. Similarly, analytics data generated on or provided to the motor 35 may be transmitted to the corresponding sensing or control devices, illustrated by the sense and control modules 72, 74 via the second port 304.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A motor drive for managing communication of control data between at least one external device and an industrial network, the motor drive comprising:

a processor operative to control the motor drive;
a network interface in communication with the processor;
a first port configured to be connected to the industrial network;
a second port configured to be connected to the at least one external device;
a third port configured to be connected to the industrial network;
a fourth port configured to be connected to the network interface; and
a network communication controller operatively connected between each of the first, second, third, and fourth ports, wherein the network communication controller is operative to receive data formatted in one of a plurality of data protocols at any one of the first, second, third, and fourth ports and to transfer the data to another of the first, second, third, and fourth ports as a function of the data protocol in which the data was received.

2. The motor drive of claim 1, wherein a first data protocol identifies a first set of data requiring deterministic communications and the network communication controller is further operative to transfer data received in the first data protocol to one of the second port and the fourth port.

3. The motor drive of claim 2, wherein a second data protocol identifies a second set of data not requiring deterministic communications and the network communication controller is further operative to transfer data received in the second data protocol to one of the first port, the third port, and the fourth port.

4. The motor drive of claim 3, wherein:
a third data protocol identifies a third set of data not requiring deterministic communications,
the third set of data is transmitted at a slower data rate than the second set of data, and
the network communication controller is further operative to transfer data received in the third data protocol to one of the first port and the second port.

5. The motor drive of claim 1, further comprising a combined power and communication cable connected between the motor drive and a motor controlled by the motor drive, wherein the motor is the at least one external device connected to the second port, and control data is transmitted between the motor drive and the motor in real-time via the combined power and communication cable.

6. A system for managing communication in a motor drive application, the system comprising:
an industrial network;
a motor drive operative to communicate via the industrial network, the motor drive including;
a processor operative to control the motor drive;
a first port configured to be connected to the industrial network;
a second port configured to be connected to at least one external device;
a third port configured to be connected to the industrial network;
a fourth port configured to be connected to the processor; and
a network communication controller operatively connected between each of the first, second, third, and fourth ports, wherein the network communication controller is operative to receive data formatted in one of a plurality of data protocols at any one of the first, second, third, and fourth ports and to transfer the data to another of the first, second, third, and fourth ports as a function of the data protocol in which the data was received.

7. The system of claim 6, wherein a first data protocol identifies a first set of data requiring deterministic communications and the network communication controller is further operative to transfer data received in the first data protocol to one of the second port and the fourth port.

8. The system of claim 7, wherein a second data protocol identifies a second set of data not requiring deterministic communications and the network communication controller is further operative to transfer data received in the second data protocol to one of the first port, the third port, and the fourth port.

9. The system of claim 8, wherein:
a third data protocol identifies a third set of data not requiring deterministic communications,
the third set of data is transmitted at a slower data rate than the second set of data, and
the network communication controller is further operative to transfer data received in the third data protocol to one of the first port and the second port.

10. The system of claim 6, wherein the motor drive also includes a network interface operatively connected between the fourth port and the processor to transmit data between the fourth port and the processor.

11. The system of claim 6, further comprising a combined power and communication cable connected between the motor drive and a motor controlled by the motor drive, wherein the motor is the at least one external device connected to the second port, and control data is transmitted between the motor drive and the motor in real-time via the combined power and communication cable.

12. The system of claim 11, wherein the motor further includes:
a second network communication controller,
a fifth port in communication between the second network communication controller and the second port, and
a sixth port in communication with the second network communication controller and configured to be connected to a sensing device, wherein the second network communication controller receives real time control data from the fifth port and sensing data from the sixth port.

13. The system of claim 12, further comprising a second combined power and communication cable connected between the motor and the sensing device.

14. A system for managing communication in a motor drive application, the system comprising:
an industrial network;
a motor drive operative to communicate via the industrial network, the motor drive including;
a processor operative to control the motor drive;
a first port configured to be connected to the industrial network;
a second port configured to be connected to a motor, where the motor is configured to be controlled by the motor drive;
a third port configured to be connected to the industrial network;
a fourth port configured to be connected to the processor; and
a first network communication controller operatively connected between each of the first, second, third, and fourth ports, wherein the first network communication controller is operative to receive data formatted in one of a plurality of data protocols at any one of the first, second, third, and fourth ports and to transfer the data to another of the first, second, third, and fourth ports as a function of the data protocol in which the data was received; and the motor configured to be controlled by the motor drive, the motor including:
- a second network communication controller,
- a fifth port in communication between the second network communication controller and the second port, and
- a sixth port in communication with the second network communication controller and configured to be connected to a sensing device, wherein the second network communication controller receives real time control data from the fifth port and sensing data from the sixth port.

15. The system of claim 14, further comprising a combined power and communication cable connected between the motor drive and the motor, wherein control data is transmitted between the motor drive and the motor in real-time via the combined power and communication cable.

16. The system of claim 15, wherein:
the motor is a first motor;
the first motor includes a seventh port in communication with the second network communication module; and
the system further comprising:
- a second motor configured to be controlled by the motor drive, the second motor including:
  - a third network communication controller, and
  - an eighth port in communication between the third network communication controller and the seventh port; and
- a second combined power and communication cable connected between the first motor and the second motor, wherein control data is transmitted between the first motor and the second motor in real-time via the second combined power and communication cable.

17. The system of claim 14, wherein the motor drive is a first motor drive, the motor is a first motor, and the processor is a first processor, the system further comprising:

a second motor drive operative to communicate via the industrial network, the second motor drive including:
- a second processor operative to control the second motor drive;
- a seventh port configured to be connected to the industrial network;
- an eighth port configured to be connected to a second motor, where the second motor is configured to be controlled by the second motor drive;
- a ninth port configured to be connected to the industrial network;
- a tenth port configured to be connected to the second processor; and
- a third network communication controller operatively connected between each of the seventh, eighth, ninth, and tenth ports, wherein the third network communication controller is operative to receive data formatted in one of the plurality of data protocols at any one of the seventh, eighth, ninth, and tenth ports and to transfer the data to another of the seventh, eighth, ninth, and tenth ports as a function of the data protocol in which the data was received.

18. The system of claim 14, wherein a first data protocol identifies a first set of data requiring deterministic communications and the controller is further operative to transfer data received in the first data protocol to a controlled device operatively connected to the motor.

19. The system of claim 18, wherein a second data protocol identifies a second set of data not requiring deterministic communications and the controller is further operative to transfer data received in the second data protocol via the industrial network.

20. The system of claim 19, wherein:
a third data protocol identifies a third set of data not requiring deterministic communications,
the third set of data is transmitted at a slower data rate than the second set of data, and
the controller is further operative to receive data in the third data protocol from a sensing module operatively connected to the motor.

* * * * *